(12) United States Patent
Yang et al.

(10) Patent No.: US 8,005,768 B2
(45) Date of Patent: Aug. 23, 2011

(54) MULTIMEDIA FILE REPRODUCING APPARATUS AND METHOD

(75) Inventors: Gyung-Hye Yang, Seoul (KR); Seung-Nyung Chung, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 938 days.

(21) Appl. No.: 11/945,513

(22) Filed: Nov. 27, 2007

(65) Prior Publication Data

US 2008/0215568 A1    Sep. 4, 2008

(30) Foreign Application Priority Data

Nov. 28, 2006  (KR) .......................... 10-2006-0118634
Sep. 3, 2007   (KR) .......................... 10-2007-0089210

(51) Int. Cl.
*G06F 15/18* (2006.01)
(52) U.S. Cl. ....................................................... 706/12
(58) Field of Classification Search .................... 706/13, 706/12
See application file for complete search history.

(56) References Cited

U.S. PATENT DOCUMENTS

| 5,891,042    A  * | 4/1999 | Sham et al. ................... 600/483 |
| 2004/0057348 A1 * | 3/2004 | Shteyn et al. ............. 369/30.38 |
| 2006/0041893 A1 * | 2/2006 | Castro et al. ................... 719/320 |
| 2006/0126452 A1 * | 6/2006 | Yamashita et al. ......... 369/30.23 |
| 2007/0074617 A1 * | 4/2007 | Vergo .............................. 84/612 |

FOREIGN PATENT DOCUMENTS

| KR | 1998-17968 | 6/1998 |
| KR | 1999-9134  | 2/1999 |
| KR | 2005-49345 | 5/2005 |
| KR | 2006-55357 | 5/2006 |

* cited by examiner

*Primary Examiner* — Jeffrey A Gaffin
*Assistant Examiner* — Vincent M Gonzales
(74) *Attorney, Agent, or Firm* — Stanzione & Kim, LLP

(57) ABSTRACT

An apparatus and method to check whether a user likes a multimedia file based on the user's emotional reaction index of the multimedia file and repeatedly reproducing the multimedia file if the user likes the multimedia file. The multimedia file reproducing apparatus can include an emotional reaction index calculation unit to calculate an emotional reaction index based on a physical reaction signal of a user; a like/dislike checking unit to check whether the user likes or dislikes a corresponding audio file based on the calculated emotional reaction index; a list generation unit to generate a list of audio files that the user likes based on an average of emotional reaction indices for each audio file and the user's preference for each audio file; and a reproduction management unit to control the reproduction of the corresponding audio file based on whether the user likes or dislikes the corresponding audio file and to reproduce the audio files in the generated list.

24 Claims, 7 Drawing Sheets

MULTIMEDIA FILE REPRODUCING APPARATUS AND METHOD

CROSS-REFERENCE TO RELATED APPLICATIONS

This application claims priority from Korean Patent Application Nos. 10-2006-0118634 filed on Nov. 28, 2006 and 10-2007-0089210 filed on Sep. 3, 2007 in the Korean Intellectual Property Office, the disclosure of which is incorporated herein by reference in its entirety.

BACKGROUND OF THE INVENTION

1. Field of the Invention

The present general inventive concept relates to reproducing a multimedia file, and more particularly, to an apparatus and method to check whether a user likes a multimedia file based on the user's emotional reaction index for the multimedia file and repeatedly reproducing the multimedia file if the user likes the multimedia file.

2. Description of the Related Art

Recently, it has become common to use portable multimedia file players that can reproduce digitally encoded audio files. That is, relatively small-sized handheld devices, which can process digitally encoded audio and video files stored in semiconductor memory devices, have become popular. Multimedia file players can be applied in various fields of MP3 players, portable multimedia players (PMPs), and mobile phones.

With the growing need for larger data storage capacity of portable multimedia file players, next-generation multimedia file players including small-sized and large-storage capacity hard drives have been developed and are gaining popularity.

While a user is listening to music using a portable multimedia file player, if a song that the user likes is played, the user may wish to repeatedly listen to the song. In contrast, if a song that the user dislikes is played, the user may wish to skip the song and listen to another song. In this case, the user himself or herself has to repeat or skip songs according to the user's preferences. In addition, if the user wishes to repeat a desired song endlessly, the user has to press a Play button whenever the desired song ends or has to set an endless repetition function for the desired song.

Korean Patent Publication No. 2006-055357 discloses an apparatus and method for reproducing music content and an apparatus for recording music content and attribute information of music content. That is, the above listed document discloses a technology that acquires music content data, which is to be reproduced, from a music content data memory unit storing a plurality of pieces of music content data, acquires biological information of a listener who is listening to the acquired music content data that is being reproduced, and determines candidate songs to be reproduced next based on the acquired biological information of the listener and attribute information acquired by a second acquisition unit. However, the prior art fails to suggest a technology that can repeat or skip a multimedia file based on whether a user likes or dislikes the multimedia file.

SUMMARY OF THE INVENTION

The present general inventive concept provides a multimedia file reproducing apparatus and method which can check whether a user likes or dislikes a multimedia file based on the user's emotional reaction index and repeatedly reproduce the multimedia file if the user likes the multimedia file.

The present general inventive concept also provides a multimedia file reproducing apparatus and method which can store a user's preferences for multimedia files and provide and reproduce a list of multimedia files highly preferred by the user at the request of the user.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept can be achieved by providing a multimedia file reproducing apparatus including an emotional reaction index calculation unit to calculate an emotional reaction index based on a physical reaction signal of a user; a like/dislike checking unit to check whether the user likes or dislikes a corresponding audio file based on the calculated emotional reaction index; a list generation unit to generate a list of audio files that the user likes based on an average of emotional reaction indices for each audio file and the user's preference for each audio file; and a reproduction management unit to control the reproduction of the corresponding audio file based on whether the user likes or dislikes the corresponding audio file and reproducing the audio files in the generated list.

The foregoing and/or other aspects and utilities of the present general inventive concept can also be achieved by providing a multimedia file reproducing method including generating a list of audio files that a user likes based on an average of the user's pre-stored emotional reaction indices for each audio file and the user's pre-stored preference for each audio file; reproducing the audio files in the generated list; calculating an emotional reaction index based on a physical reaction signal of the user for each reproduced audio file; checking whether the user likes or dislikes a corresponding audio file based on the calculated emotional reaction index; and controlling the reproduction of the corresponding audio file based on whether the user likes or dislikes the corresponding audio file.

The foregoing and/or other aspects and utilities of the present general inventive concept can also be achieved by providing a multimedia file reproducing apparatus including a control unit to receive an emotional reaction index of a user and to determine the user's preference for a corresponding audio file based on the emotional reaction index; a list generation unit to generate a list of audio files that the user likes based on an average of emotional reaction indices for each audio file and the determined user's preference for each audio file; and a reproduction management unit to control the reproduction of the corresponding audio file based on the user's preference of the corresponding audio file and to reproduce the audio files in the generated list. The control unit can receive an emotional reaction index of a user through signals tracking a heartbeat of the user, wherein the signals can be received either by wire or wirelessly.

The foregoing and/or other aspects and utilities of the present general inventive concept can also be achieved by providing a multimedia file reproducing method including receiving an emotional reaction index of a user and determining the user's preference for a corresponding audio file based on the emotional reaction index; generating a list of audio files that the user likes based on an average of emotional reaction indices for each audio file and the determined user's preference for each audio file; and controlling the reproduction of the corresponding audio file based the user's preference of the corresponding audio file and reproducing the audio files in the generated list.

The foregoing and/or other aspects and utilities of the present general inventive concept can also be achieved by providing a recording medium storage unit that has stored thereon programs to perform a multimedia file reproducing method, the method including receiving an emotional reaction index of a user and determining the user's preference for a corresponding audio file based on the emotional reaction index; generating a list of audio files that the user likes based on an average of emotional reaction indices for each audio file and the determined user's preference for each audio file; and controlling the reproduction of the corresponding audio file based the user's preference of the corresponding audio file and reproducing the audio files in the generated list.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Hereinafter, exemplary embodiments of the present general inventive concept will be described in detail with reference to the accompanying drawings.

Figure 1:
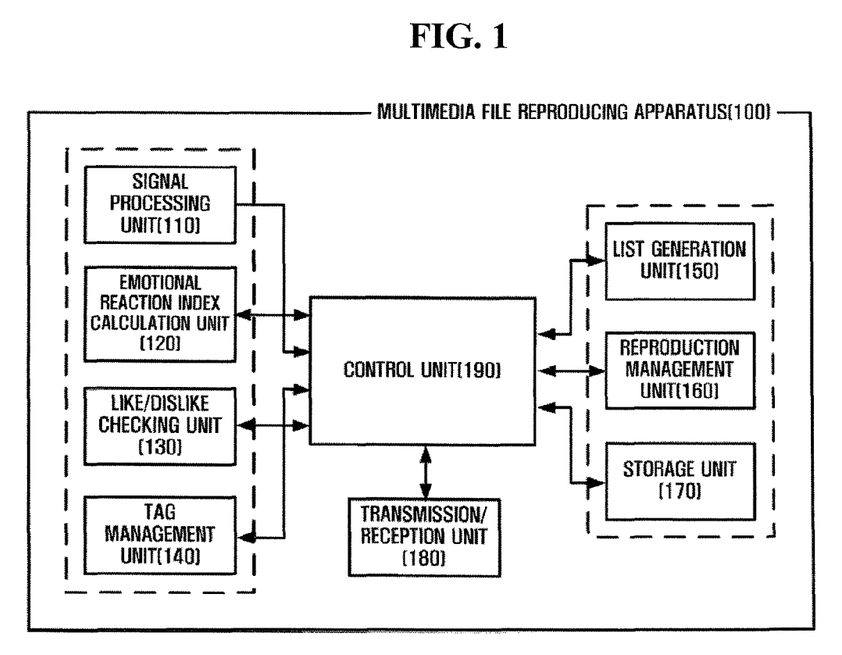
FIG. 1 is a block diagram of a multimedia file reproducing apparatus according to an exemplary embodiment of the present general inventive concept.

FIG. 1 is a block diagram of a multimedia file reproducing apparatus 100 according to an exemplary embodiment of the present general inventive concept.

Referring to FIG. 1, the multimedia file reproducing apparatus 100 includes a signal processing unit 110, an emotional reaction index calculation unit 120, a like/dislike checking unit 130, a tag management unit 140, a list generation unit 150, a reproduction management unit 160, a storage unit 170, a transmission/reception unit 180, and a control unit 190. It is assumed that the multimedia file reproducing apparatus 100 is an MP3 player, a portable multimedia player, a mobile phone, an ultra mobile PC or a television and reproduces audio and image files.

The signal processing unit 110 receives a physical reaction signal of a user which can be measured using a contact or non-contact sensor. That is, if a heartbeat waveform of a user, who is enjoying an audio file, is measured by a sensor which may be in contact or not in contact with a part of the body of the user, the signal processing unit 110 receives a signal representing the measured heartbeat waveform. In this case, the contact or non-contact sensor may sense the excitation of an emotional reaction of the user, and data obtained from the contact or non-contact sensor may be used to determine whether the user likes or dislikes the audio file. The contact or non-contact sensor may include transmitting signals by a wire or wirelessly. In addition, conventional methods of measuring changes in heartbeat may be applied. The contact sensor may be a photoplethysmography (PPG) sensor sensing changes in the amount of blood flow per unit time, and the non-contact sensor may be a radio frequency identification (RFID) sensor using the amount of reflection of light.

The contact sensor may be installed in an audio device, such as a headset, and the multimedia file reproduction apparatus 100 may be attached to the chest of a user so that it can measure changes in the user's heartbeat.

In addition, the signal processing unit 110 obtains heart-rate data from the received heartbeat waveform data and transmits the heart-rate data to the emotional reaction index calculation unit 120.

The emotional reaction index calculation unit 120 detects indices (such as low frequency (LF), high frequency (HF), standard deviation of normal-to-normal intervals (SDNN), and root of the mean square difference of successive normal-to-normal intervals (RMSSD)) required to calculate an emotional reaction index based on the heart-rate data received from the signal processing unit 110. Then, the emotional reaction index calculation unit 120 calculates the emotional reaction index and a reference average value using the detected indices. Here, the emotional reaction index calculation unit 120 may calculate the emotional reaction index using one of the detected indices.

Figure 2:
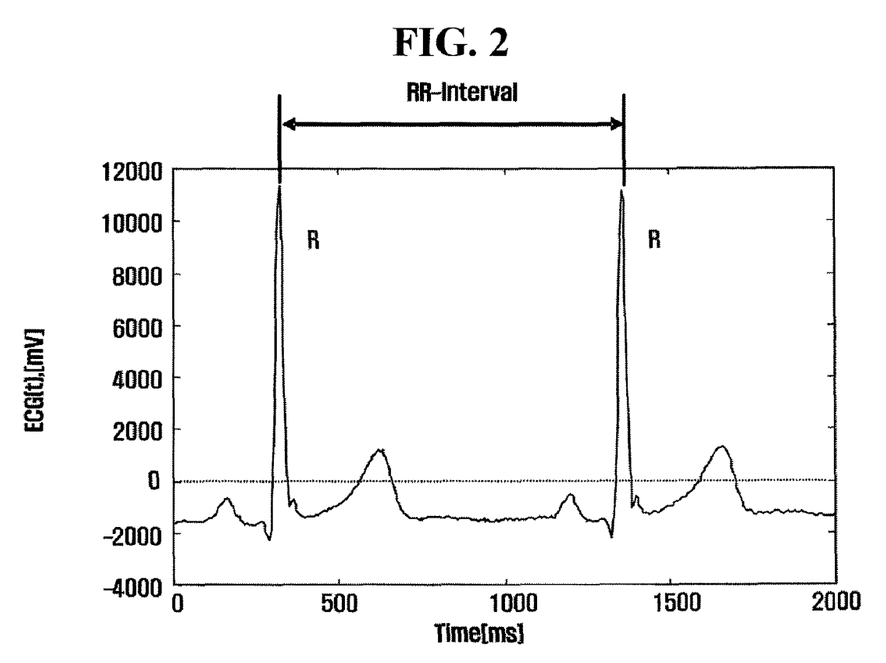
FIG. 2 is a graph illustrating a time interval RR($\tau$) measured by the multimedia file reproducing apparatus of FIG. 1.

Equation (1) is used to calculate an emotional reaction index E(t) at a time t. In Equation (1), it is assumed that the emotional reaction index E(t) is represented by SDNN for N seconds and that a data re-sampling rate is F(Hz).

$$E(t) = \frac{1}{N \times F} \sum_{\tau=(t-N)F+1}^{t \times F} \left(RR\left(\frac{\tau}{F}\right)^2\right) - \left(\frac{1}{N \times F} \sum_{\tau=(t-N)F+1}^{t \times F} RR\left(\frac{\tau}{F}\right)\right)^2, \quad (1)$$

where RR($\tau$) indicates a time interval (seconds) between heartbeat peaks, and F may be 2 to 4 Hz. The time interval RR($\tau$) will be described later with reference to FIG. 2.

Equation (2) is used to calculate a reference value which is an average of emotional reaction times for a predetermined period of time xt from when the user starts to listen to a first audio file.

$$E_b = \frac{1}{t_b - t_s} \int_{t}^{T} E(t) dt, \quad (2)$$

where $t_s$ indicates a start portion of the audio file, and $t_b = t_s + xt$. Here, emotional reactions of the user are detected for a predetermined period of time from the start portion of the audio file in order to calculate emotional reaction indices according to changes in the heartbeat of the user who is listening to the audio file. A reference value, which is an average of the calculated emotional reaction indices, may be different for each user. Therefore, a section $t_s \sim t_b$ of the audio file in which a reference value is set may be excluded from data used to determine whether the user has emotionally reacted to the audio file.

Equation (3) is used to calculate a value representing a user's dislike of an audio file at a predetermined time t while the user is listening to the audio file. In this case, since the user's emotion has been changed by a previously reproduced audio file at the time when the user is listening to a start portion of a second or subsequent audio file, emotional reaction indices for a predetermined period of time dt from the start portion of each audio file are excluded from values used to determine whether the user likes the audio file.

$$\frac{1}{t-t_b} \int_t^\tau E(t)dt < E_b - TH_0, \quad (3)$$

where $$\frac{1}{t-t_b} \int_t^\tau E(t)dt$$

indicates an average of emotional reaction indices for a predetermined period of time $t_b$~$t$, and $TH_O$ is a predetermined first threshold value.

That is, if $$\frac{1}{t-t_b} \int_t^\tau E(t)dt$$

s less than $E_b$–$TH_O$, it is determined that the user's emotion reaction index is consistently low, and thus that the user's preference for a corresponding audio file is low. Accordingly, the audio file currently being reproduced is skipped, and a next audio file is reproduced.

Equation (4) is used to calculate a value representing a user's preference for an audio file after the user listens to the audio file from a predetermined time to an end time $t_e$.

$$\frac{1}{t_e-t_b} \int_t^\tau E(t)dt > E_b - TH_1, \quad (4)$$

where $$\frac{1}{t_e-t_b} \int_t^\tau E(t)dt$$

indicates an average of emotional reaction indices for a predetermined period of time $t_b$~$t_e$, and $TH_1$ indicates a predetermined second threshold value.

That is, if $$\frac{1}{t_e-t_b} \int_t^\tau E(t)dt$$

is greater than $E_b$+$TH_1$, it is determined that the user's emotional reaction index is consistently high, and thus that the user's preference for the audio file is high. Accordingly, the audio file is repeatedly reproduced.

Based on Equations (1) through (4), an emotional reaction index and a reference value can be calculated. Here, the higher the emotional reaction index, the higher the probability that a user has been emotionally moved by an audio file that the user is listening to.

However, since the emotional reaction index may vary according to, for example, the user's body conditions, a value measured for a predetermined period of time from when the user started to listen to music is determined to be a reference value, and changes in the emotional reaction index of the user while the user is listening to the music after the predetermined period of time are calculated. That is, when an emotional reaction index is calculated, a value representing an emotional reaction of a user for a predetermined period of time from when the user starts to listen to music is used as a reference value, and the user's preference for the music currently being reproduced is determined based on the reference value.

If an emotional reaction index calculated is greater than a predetermined threshold value, it is determined that a user's preference for the music is high. In contrast, if the calculated emotional reaction index is less than the predetermined threshold value, it is determined that the user's preference for the music is low.

The like/dislike checking unit 130 checks whether a user likes or dislikes an audio file based on a calculated emotional reaction index. In this case, whether the user likes or dislikes the audio file may be determined based on values calculated using Equations (3) and (4).

The tag management unit 140 presents tag information indicating a user's preference for an audio file based on an emotional reaction index calculated by the emotional reaction index calculation unit 120. The tag information is presented only when high peaks are detected in a heartbeat waveform of a user.

For example, whether to repeat or skip an audio file is determined based on the number of tag information of the audio file. That is, if the audio file has a lot of tag information, a lot of high peaks are detected in a heartbeat waveform of a user. Accordingly, it is determined that the user's preference for the audio file is high.

Figure 3A:
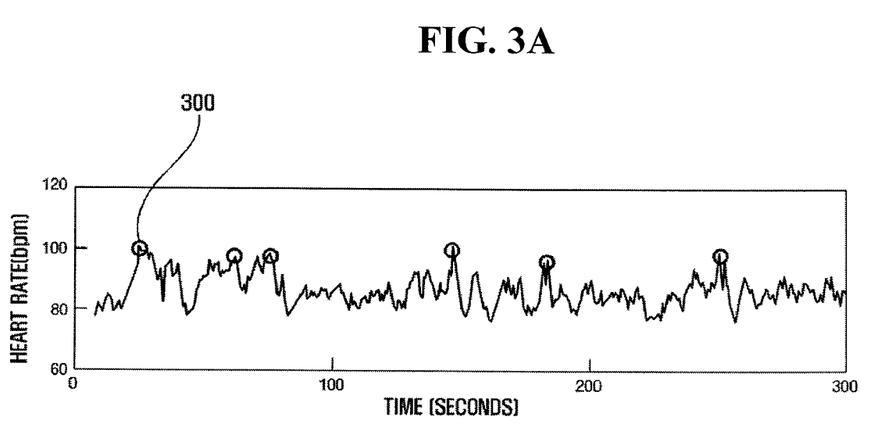
FIGS. 3A and 3B illustrate an example of determining whether the multimedia file reproducing apparatus of FIG. 1 is to perform repeated reproduction in units of sections or in units of audio files.
Figure 3B:
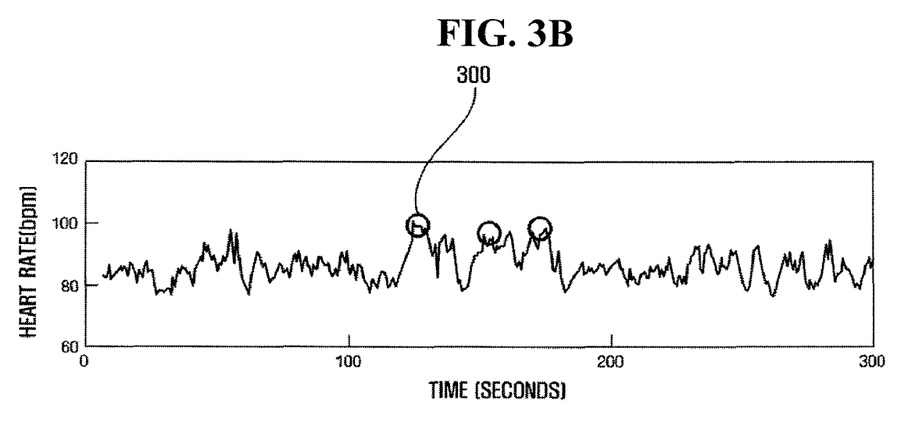

In addition, the tag management unit 140 checks the tag information in the heartbeat waveform of the user for the audio file. If the tag management unit 140 finds out that the tag information is concentrated in a specific section of the audio file within a specific time, it determines that the user likes only the specific section of the audio file. In addition, if the tag information is distributed over an entire period of time during which the audio file is reproduced, the tag management unit 140 determines that the user likes the audio file. Based on the determination result of the tag management unit 140, it is determined whether to repeat the audio file in units of sections or repeat the entire audio file. Determining whether to perform repeated reproduction in units of sections or audio files will be described later with reference to FIG. 3.

The list generation unit 150 generates a priority list of audio files preferred by a user based on average, maximum and minimum values of the user's emotional reaction index for each audio file and the user's preference index for each audio file.

For example, it is assumed that a user has listened to audio file A five times, listened to audio file B three times, skipped audio file C, listened to audio file D once, listened to audio file E three times, listened to audio file F twice, listened to audio file G four times, and skipped audio file H.

The list generation unit 150 determines that the user likes audio files that the user has repeatedly listened to. Therefore, the list generation unit 150 prioritizes the audio files according to the number of times that the user has listened to the audio files and generates a priority list of audio files. That is, the priority list includes audio files A, G, B, E and F. In this case, it is assumed that, if the user has listened to an audio file two or more times, the list generation unit 150 determines that the user likes the audio file. Accordingly, audio files (i.e., D, C and H) that the user has listened to only once or skipped are not included in the priority list.

In addition, the list generation unit 150 regenerates a priority list based on emotional state information, which is obtained based on physical reaction signals of the user, and miscellaneous information (such as weather information, position information, and audio file information). In this case, the list generation unit 150 regenerates the priority list by assigning different weights to the emotional state information and the miscellaneous information. The weights may be arbitrarily set by the user or the control unit 190. The list generation unit 150 may also regenerate the priority list using the emotional state information of the user or the miscellaneous information.

For example, audio files in a priority list generated by the list generation unit 150 may be reproduced by a user. In this case, it is assumed that the list generation unit 150 regenerates a priority list based on the emotional state information of the user and the miscellaneous information (for example, the position information). Regenerating the priority list based on the emotional state information and the position information is an exemplary embodiment of the present general inventive concept. The priority list may also be regenerated using other information in addition to the emotional state information and the position information.

Next, if a first audio file is reproduced, a current emotional state of the user (that is, a physical reaction signal of the user) is checked based on a reference value which is an average of emotional reaction times and which is calculated using Equation (2). In addition, current position information of the user is received from the transmission/reception unit 180 included in the multimedia file reproducing apparatus 100. Alternatively, the current position information of the user may be received from a global positioning system (GPS).

Then, audio files, which the user liked when the user was in the same emotional state (that is, the physical reaction signal of the user) as the checked emotional state (that is, the physical reaction signal), and audio files, which the user listened to when the user was located at the same position as the current position information (for example, Seoul) of the user, are searched for. The previous emotional state and position information of the user can be obtained based on an emotional reaction index value for each audio file and position information stored in the storage unit 170.

Figure 4A:
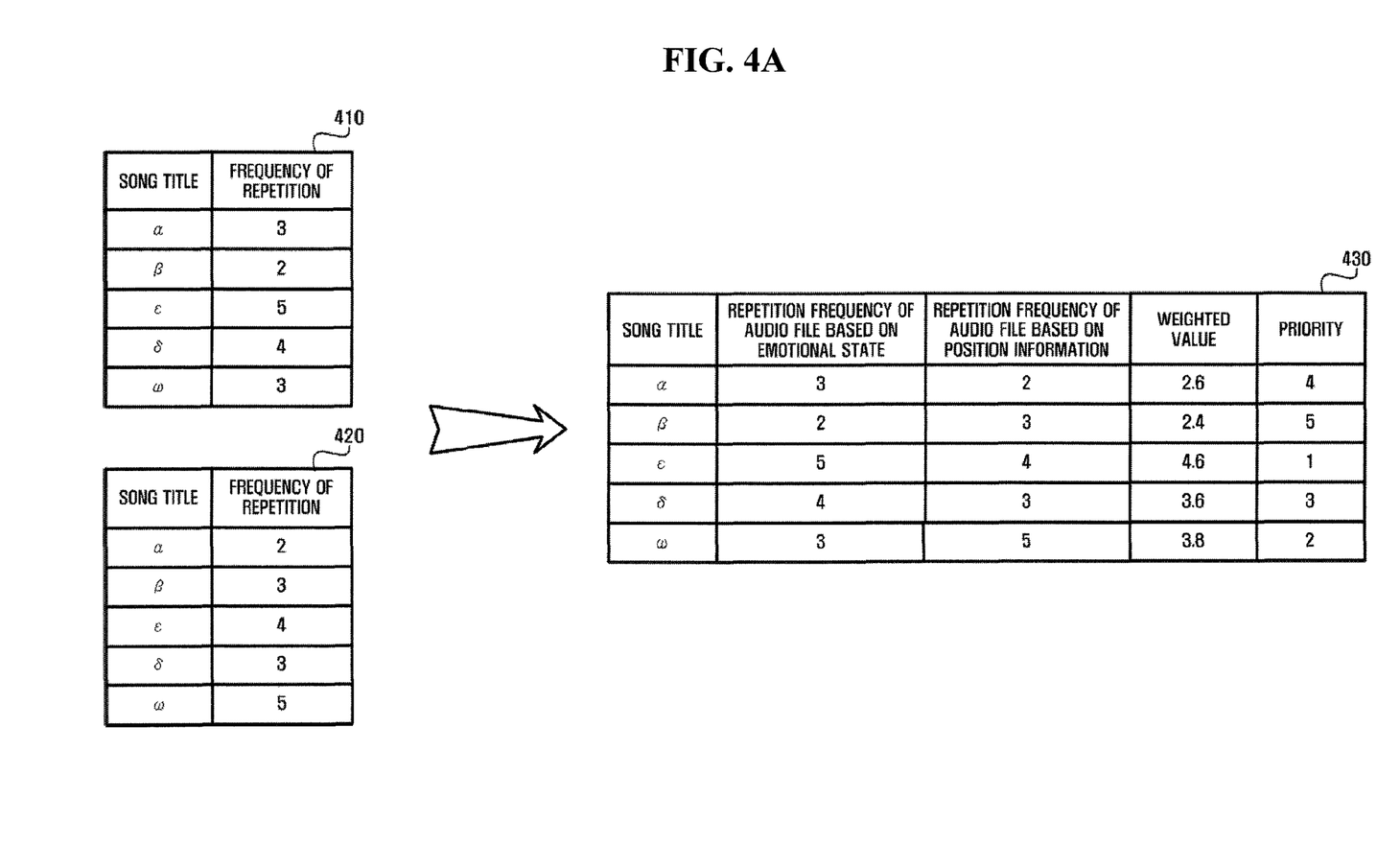
FIGS. 4A and 4B illustrate an example of regenerating a priority list using a list generation unit of the multimedia file reproducing apparatus of FIG. 1.

That is, referring to FIG. 4A, the list generation unit 150 searches for a list 410 of audio files, which are stored in the storage unit 170 and which the user listened to when the user was in a particular emotional state, and a list 420 of audio files, which are stored in the storage unit 170 and which the user listened to when the user was in a particular location, for example Seoul, applies preset weights for each of the emotional state information and the position information, and calculates state values for the emotional state information and the position information.

Then, the list generation unit 150 generates a priority list 430 which prioritizes audio files including the emotional state information and the position information of the user based on the calculated state values. In this case, it is assumed that the preset weight for the emotional state information of the user is 0.6 and that the preset weight for the position information of the user is 0.4.

Figure 4B:
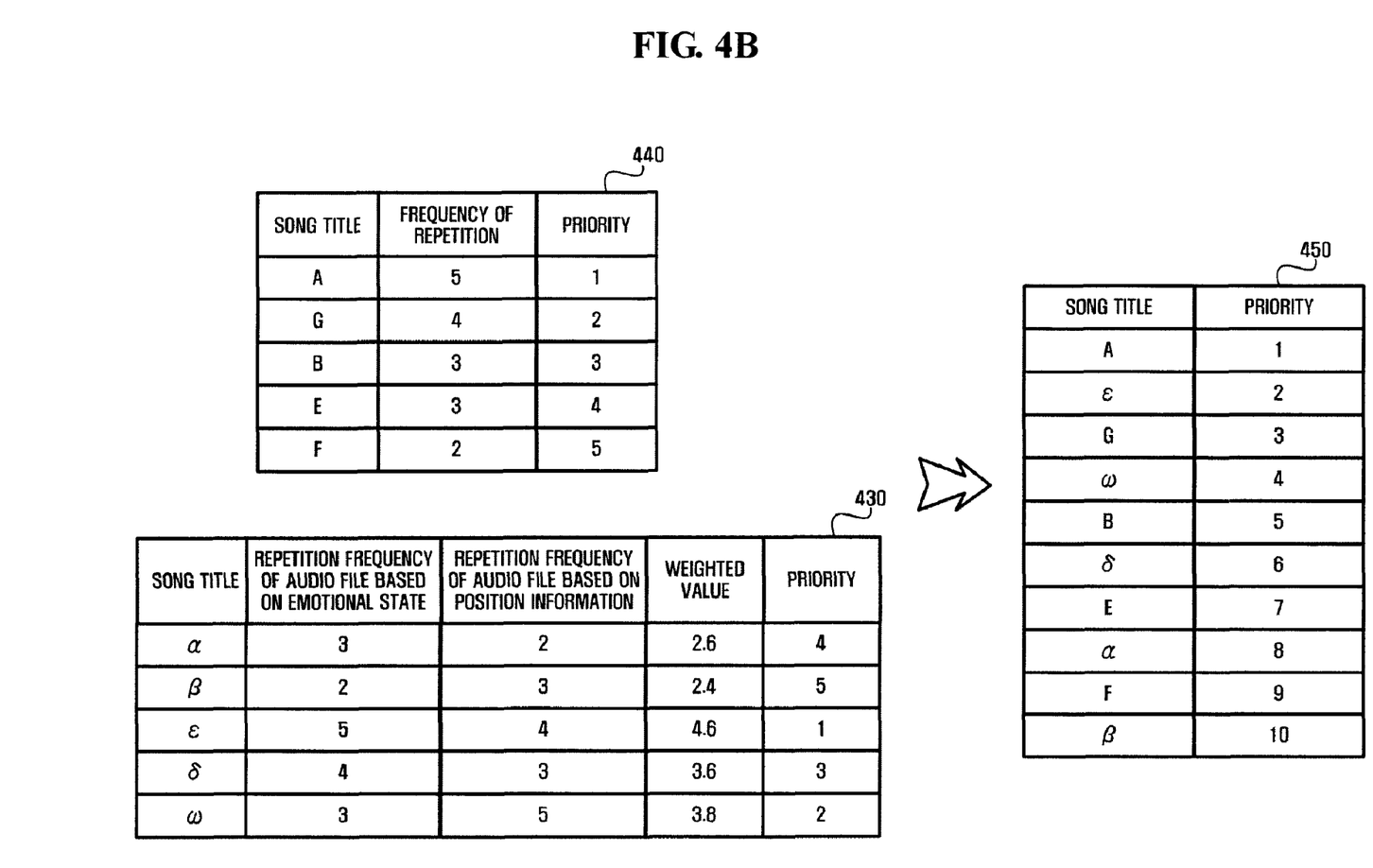

Next, referring to FIG. 4B, the priority list 430, which prioritizes the audio files based on the emotional state information and the position information of the user, is combined with a previously generated priority list 440 into a new priority list 450.

Accordingly, the user can listen to desired audio files according to the user's current emotional state and position without having to select them from a plurality of audio files.

The reproduction management unit 160 controls the repeated reproduction or the skipping of an audio file based on information received from the like/dislike checking unit 130, wherein the information indicates whether the user likes or dislikes the audio file.

For example, if an emotional reaction index for an audio file is high, the reproduction management unit 160 determines that a user's preference for the audio file is high and thus repeatedly reproduces the audio file. In contrast, if the emotional reaction index for the audio file is low, the reproduction management unit 160 determines that the user's preference for the audio file is low (that is, the user does not like the audio file) and thus skips the audio file and reproduces a next audio file.

In addition, the reproduction management unit 160 sequentially reproduces audio files in order of highest to lowest priority based on a priority list generated by the list generation unit 150.

The storage unit 170 stores multimedia files (that is, audio files), physical reaction signals received from the signal processing unit 110, an emotional reaction index value for each audio file, tag information, preference indices and miscellaneous information (for example, weather information, position information and audio file information).

For example, after the reproduction of an audio file is completed, the storage unit 170 stores an emotional reaction index value and tag information for the audio file. In addition, the storage unit 170 stores a preference index for the audio file that the user listened to.

The transmission/reception unit 180 transmits audio files of the multimedia file reproducing apparatus 100 to another multimedia file reproducing apparatus connected by a network or receives audio files from the multimedia file reproducing apparatus.

For example, user A may receive an audio file that user A listened to in a particular condition (for example, the same physical reaction signal) from a multimedia file reproducing apparatus of user B by using the multimedia file reproducing apparatus 100.

In addition, the transmission/reception apparatus 180 may receive the position information of a user from the GPS.

At the request of the list generation unit 150, the control unit 190 searches for audio files that a user listened to in a particular condition and preference indices for the audio files and provides the found audio files and preference indices to the list generation unit 150. In this case, the audio files that the user listened to when in the particular condition may be audio files that the user listened to when the user generated a particular physical reaction signal and when the user was located at a particular position.

For example, if the list generation unit 150 requests information regarding a physical reaction signal identical to a currently checked physical reaction signal of a user and audio files corresponding to the information, the control unit 190 searches the storage unit 170 for the audio files.

When requested by another multimedia file reproducing apparatus to provide audio files corresponding to a predetermined condition through the transmission/reception unit 180, the control unit 190 searches for the audio files and provides the found audio files.

In addition, the control unit 190 controls the operation of each of the signal processing unit 110, the emotional reaction index calculation unit 120, the like/dislike checking unit 130, the tag management unit 140, the list generation unit 150, the reproduction management unit 160, the storage unit 170, and the transmission/reception unit 180 included in the multimedia file reproducing apparatus 100.

The term 'unit', as used herein, refers to, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

FIG. 2 is a graph illustrating a time interval RR($\tau$) measured by the multimedia file reproducing apparatus 100 of FIG. 1.

Referring to FIG. 2, RR($\tau$) indicates the time interval (seconds) between heartbeat peaks at a time $\tau$, that is, an interval between successive peaks. The time interval RR($\tau$) is measured and used to calculate an emotional reaction index of a user.

FIGS. 3A and 3B illustrate an example of determining whether the multimedia file reproducing apparatus 100 is to perform repeated reproduction in units of sections or in units of audio files. Tag information is presented in a heartbeat waveform of a user in order to indicate the user's preference for an audio file.

Referring to FIG. 3A, if a heartbeat signal of a user is input through the signal processing unit 110, the tag management unit 140 presents tag information 300 indicating the user's preference for an audio file.

Then, the tag management unit 140 checks the presented tag information 300 and determines whether the tag information 300 are concentrated in a specific section of the audio file within a specific time or whether the tag information 300 is distributed over an entire period of time during which the audio file is reproduced.

In FIG. 3A, the tag information 300 is distributed over the entire period of time during which the audio file is reproduced. Accordingly, it is determined that the user likes the audio file, and the audio file is repeatedly reproduced.

If the tags 300 are concentrated in a specific section within a specific time (for example, for 100 to 200 seconds), it is determined that the user likes the specific section of the audio file, and only the specific section of the audio file is repeatedly reproduced.

Figure 5:
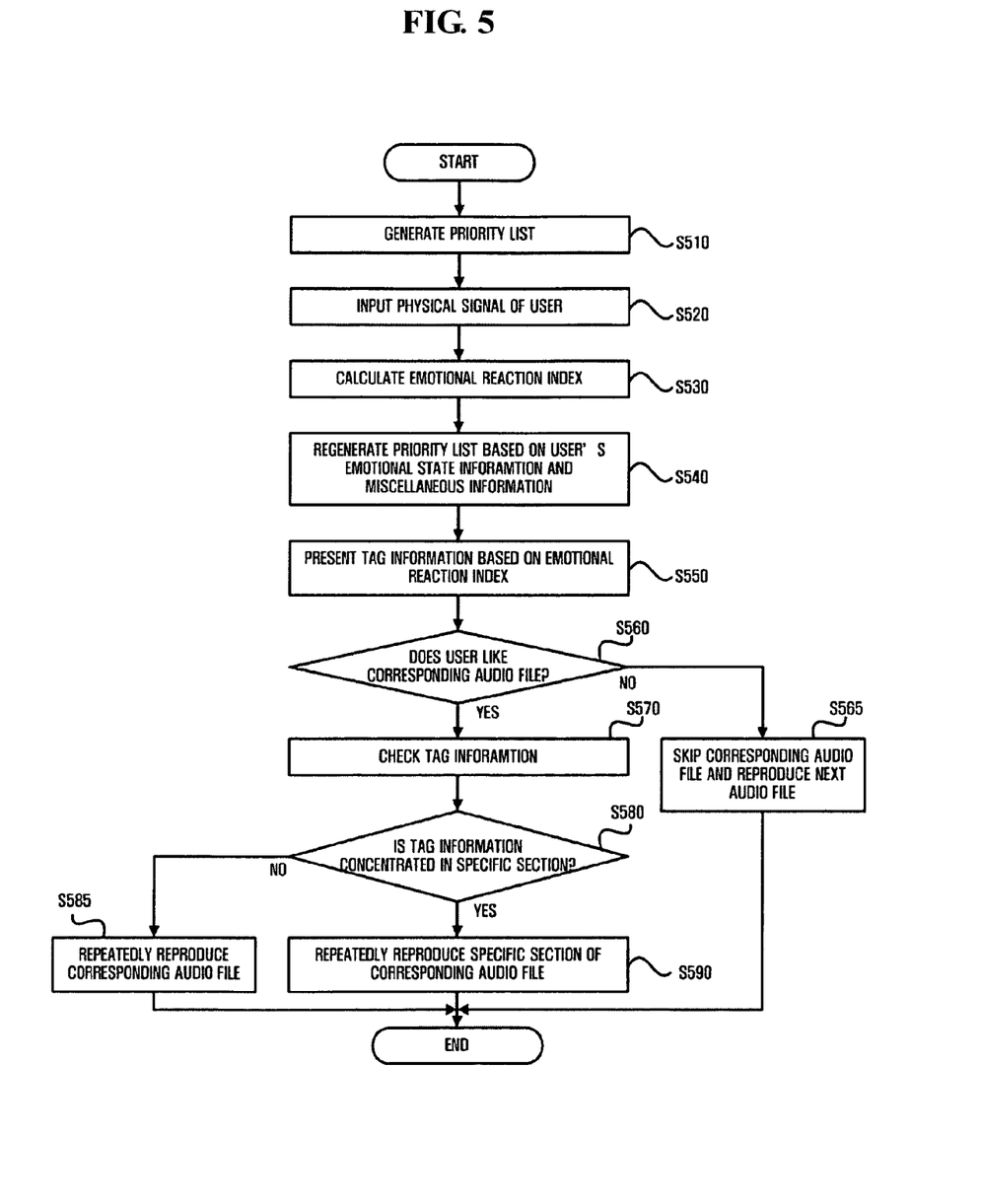
FIG. 5 is a flowchart illustrating a multimedia file reproducing method according to an exemplary embodiment of the present general inventive concept.

FIG. 5 is a flowchart illustrating a multimedia file reproducing method according to an exemplary embodiment herein.

Referring to FIG. 5, at the request of a user, the reproduction management unit 160 reproduces audio files in a priority list generated by the list generation unit (operation S510). In this case, the priority list is generated based on average, maximum and minimum values of the user's emotional reaction index for each audio file and the user's preference index for each audio file.

Next, the signal processing unit 110 receives a physical reaction signal of the user from a contact or non-contact sensor (operation S520). In this case, the sensor may be a PPG sensor sensing changes in the amount of blood flow per unit time, and the non-contact sensor may be an RFID sensor using the amount of reflection of light. Generally, changes in heartbeat of a user are measured using a sensor.

Then, the signal processing unit 110 obtains heart-rate data from the received heartbeat waveform data, and the emotional reaction index calculation unit 120 detects indices (such as LF, HF, SDNN, and RMSSD) required to calculate an emotional reaction index based on the heart-rate data and the emotional index calculation unit 120 calculates the emotional reaction index using the detected indices (operation S530). Since the process of calculating the emotional reaction index has been described above with reference to Equation (1), a detailed description thereof will be omitted.

If a first audio file is reproduced, the emotional reaction index calculation unit 120 checks a current emotional state of the user based on a reference value which is an average of emotional reaction times and which is calculated using Equation (2). Then, the list generation unit 150 requests the control unit 190 to search for audio files that the user liked when the user was in the same emotional state as the checked emotional state. In addition, the list generation unit 150 requests the control unit 190 to provide audio files that the user listened to when in the same condition as a current condition by using miscellaneous information.

Next, the list generation unit 150 regenerates a new priority list based on information retrieved by the control unit 190 (operation S540). Since the process of regenerating the priority list has been described above with reference to FIGS. 4A and 4B, a detailed description thereof will be omitted.

The tag management unit 140 presents tag information based on the calculated emotional reaction index (operation S550). The tag information indicates the user's preference for an audio file and is presented only when high peaks are detected in a heartbeat waveform of a user.

The like/dislike checking unit 130 checks whether the user likes or dislikes a corresponding audio file (a user's preference of an audio file) based on the calculated emotional reaction index (operation S560).

If it is determined in operation S560 that the user does not like the audio file, the reproduction management unit 160 stops reproducing the audio file (that is, skips the audio file) and reproduces a next audio file (operation S565).

If it is determined in operation S560 that the user likes the audio file, the tag management unit 140 checks tag information of the audio file (operation S570).

If it is determined in operation S570 that the tag information is concentrated in a specific section of the audio file within a specific time (operation S580), the reproduction management unit 160 determines that the user likes only the specific section of the audio file within the specific time and thus repeatedly reproduces the specific section of the audio file (operation S590). Here, the emotional reaction index is calculated while the specific section of the audio file within the specific time is repeated, and it is determined whether to continuously repeat the specific section of the audio file or reproduce a next audio file based on the calculated emotional reaction index.

On the other hand, if it is determined in operation S570 that the tag information is distributed over an entire period of time during which the audio file is reproduced, the tag management unit 140 determines that the user likes the audio file and repeatedly reproduces the audio file (operation S585).

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains. The method illustrated in FIG. 1 can be stored in the computer-recorded medium in a form of computer-readable codes to perform the method when the computer reads the computer-readable codes of the recording medium.

As described above, a multimedia file reproducing apparatus and method according to the various embodiments of the present general inventive concept provide the following as well as other exemplary benefits.

An apparatus and method according to embodiments herein can check whether a user likes or dislikes a multimedia file based on the user's emotional reaction index. Therefore, the apparatus and method can repeatedly reproduce the multimedia file if the user likes the multimedia file and can skip the multimedia file if the user does not like the multimedia file.

In addition, an apparatus and method according to embodiments herein can generate a list of audio files based on the user's preferences and current emotional state or other information. Thus, the user can listen to highly preferred multimedia files without having to select them from a plurality of multimedia files. Also, the user can be provided with audio files suitable for the user's current situation.

Since the apparatus and method can receive audio files from other multimedia file reproducing apparatuses over a network, the user can enjoy various audio files according to the user's tastes.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A multimedia file reproducing apparatus comprising:
   an emotional reaction index calculation unit to calculate an emotional reaction index based on a physical reaction signal of a user;
   a like/dislike checking unit to check whether the user likes or dislikes a corresponding audio file based on the calculated emotional reaction index;
   a list generation unit to generate a list of audio files that the user likes based on an average of emotional reaction indices for each audio file and the user's preference for each audio file; and
   a reproduction management unit to control the reproduction of the corresponding audio file based on whether the user likes or dislikes the corresponding audio file and to reproduce the audio files in the generated list, wherein the average of emotional reaction indices for each audio file is a difference between the emotional reaction index less emotional indices measured during a predetermined period of time from a start portion of each audio file.

2. The apparatus of claim 1, wherein the emotional reaction index calculation unit calculates the emotional reaction index using a time interval between heartbeat peaks at a time $\tau$.

3. The apparatus of claim 2, wherein the emotional reaction index calculation unit calculates an emotional reaction index at a time t using $$E(t) = \frac{1}{N \times F} \sum_{\tau=(t-N)F+1}^{t \times F} \left(RR\left(\frac{\tau}{F}\right)\right)^2 - \left(\frac{1}{N \times F} \sum_{\tau=(t-N)F+1}^{t \times F} RR\left(\frac{\tau}{F}\right)\right)^2,$$

where $RR(\tau)$ indicates a time interval (seconds) between heartbeat peaks at a time $\tau$, and F indicates a re-sampling rate and is an emotional reaction for N seconds.

4. The apparatus of claim 1, wherein the emotional reaction index calculation unit calculates a reference value using $$E_b = \frac{1}{t_b - t_s} \int_{t_s}^{t_b} E(t) dt,$$

where $t_s$ indicates a start portion of an audio file, and $t_b = t_s + xt$.

5. The apparatus of claim 1, wherein the emotional reaction index calculation unit calculates a value representing the user's dislike of an audio file using $$\frac{1}{t - t_b} \int_{t_b}^{t} E(t) dt < E_b - TH_0,$$

where $$\frac{1}{t - t_b} \int_{t_b}^{t} E(t) dt$$

indicates an average of emotional reaction indices for $t_b \sim t$, and $TH_O$ is a predetermined first threshold value.

6. The apparatus of claim 5, wherein the emotional reaction index calculation unit calculates a value representing the user's preference for an audio file using $$\frac{1}{t_e - t_b} \int_{t_b}^{t_e} E(t) dt > E_b + TH_1,$$

where $$\frac{1}{t_e - t_b} \int_{t_b}^{t_e} E(t) dt$$

indicates an average of emotional reaction indices for $t_b \sim t_e$, and $TH_1$ indicates a predetermined second threshold value.

7. The apparatus of claim 1, wherein the list generation unit generates the list of the audio files prioritized in order of highest to lowest preference of the user and adds an audio file, which comprises a predetermined condition based on a current state of the user, to the generated list.

8. The apparatus of claim 1, wherein the reproduction management unit repeatedly reproduces the corresponding audio file if the user's preference for the corresponding audio file is high.

9. The apparatus of claim 1, further comprising:
a tag management unit to present tag information, which indicates the user's preference for the corresponding audio file based on the calculated emotional reaction index; and
a control unit to search for audio files comprising a predetermined condition at the request of the list generation unit and to provide the found audio files.

10. The apparatus of claim 9, further comprising:
a transmission/reception unit to transmit the found audio files to another multimedia file reproducing apparatus or to receive audio files from the another multimedia file reproducing apparatus.

11. A multimedia file reproducing method for a multimedia file reproducing apparatus, the method comprising:
generating a list of audio files that a user likes based on an average of a user's pre-stored emotional reaction indices for each audio file and a user's pre-stored preference for each audio file;
reproducing the audio files in the generated list;
calculating an emotional reaction index based on a physical reaction signal of the user for each reproduced audio file excluding emotional indices measured for a predetermined period of time from a start portion of the corresponding audio file;
checking whether the user likes or dislikes a corresponding audio file based on the calculated emotional reaction index; and
controlling the reproduction of the corresponding audio file based on whether the user likes or dislikes the corresponding audio file.

12. The method of claim 11, wherein an emotional reaction index at a time t is calculated using $$E(t) = \frac{1}{N \times F} \sum_{\tau=(t-N)F+1}^{t \times F} \left(RR\left(\frac{\tau}{F}\right)^2\right) - \left(\frac{1}{N \times F} \sum_{\tau=(t-N)F+1}^{t \times F} RR\left(\frac{\tau}{F}\right)\right)^2,$$

where $RR(\tau)$ indicates a time interval (seconds) between heartbeat peaks at a time $\tau$, and F indicates a re-sampling rate and is an emotional reaction for N seconds.

13. The method of claim 11, wherein a reference value is calculated based on the emotional reaction index and using $$E_b = \frac{1}{t_b - t_s} \int_t^\tau E(t)dt,$$

where $t_s$ indicates a start portion of an audio file, and $t_b = t_s + xt$.

14. The method of claim 11, wherein a value representing the user's dislike of the corresponding audio file is calculated using $$\frac{1}{t - t_b} \int_t^\tau E(t)dt < E_b - TH_0,$$

where $$\frac{1}{t - t_b} \int_t^\tau E(t)dt$$

indicates an average of emotional reaction indices for $t_b \sim t$, and $TH_O$ is a predetermined first threshold value.

15. The method of claim 11, wherein a value representing the user's preference for the corresponding audio file is calculated using $$\frac{1}{t_e - t_b} \int_t^\tau E(t)dt > E_b + TH_1,$$

where $$\frac{1}{t_e - t_b} \int_t^\tau E(t)dt$$

indicates an average of emotional reaction indices for $t_b \sim t_e$, and $TH_1$ indicates a predetermined second threshold value.

16. The method of claim 11, wherein the list of the audio files are prioritized in order of highest to lowest preference of the user, and an audio file, which comprises a predetermined condition based on a current state of the user, to the generated list.

17. The method of claim 16, further comprising:
transmitting an audio file comprising the predetermined condition to another multimedia file reproducing apparatus; and
receiving an audio file from the another multimedia file reproducing apparatus and adding the audio file to the generated list.

18. The method of claim 11, wherein the controlling of the reproduction of the corresponding audio file comprises repeatedly reproducing the corresponding audio file if the user's preference for the corresponding audio file is high.

19. The method of claim 11, further comprising presenting tag information, which indicates the user's preference for the corresponding audio file based on the calculated emotional reaction index.

20. A multimedia file reproducing apparatus comprising:
a control unit to receive an emotional reaction index of a user and to determine the user's preference for a corresponding audio file based on the emotional reaction index;
a list generation unit to generate a list of audio files that the user likes based on an average of a difference of emotional reaction indices for each audio file and emotional indices measured during a predetermined period of time from a start portion of the audio file and the determined user's preference for each audio file; and
a reproduction management unit to control the reproduction of the corresponding audio file based on the user's preference of the corresponding audio file and to reproduce the audio files in the generated list.

21. The multimedia file reproducing apparatus of claim 20, wherein the control unit receives an emotional reaction index of a user through signals tracking the user's heartbeat.

22. The multimedia file reproducing apparatus of claim 21, wherein the signals tracking the user's heartbeat are received wirelessly.

23. A multimedia file reproducing method for a multimedia file reproducing apparatus, the method comprising:

receiving an emotional reaction index of a user and determining the user's preference for a corresponding audio file based on the emotional reaction index;

generating a list of audio files that the user likes based on an average of emotional reaction indices for each audio file and the determined user's preference for each audio file; and controlling the reproduction of the corresponding audio file based the user's preference of the corresponding audio file and reproducing the audio files in the generated list, wherein the average of emotional reaction indices for each audio file is a difference between the emotional reaction index and emotional indices measured for a predetermined period of time from a start portion of each audio file.

24. A recording medium storage unit that has stored thereon programs to perform a multimedia file reproducing method, the method comprising:

generating a list of audio files that a user likes based on an average of a user's pre-stored emotional reaction indices for each audio file and a user's pre-stored preference for each audio file;

reproducing the audio files in the generated list;

calculating an emotional reaction index based on a physical reaction signal of the user for each reproduced audio file;

checking whether the user likes or dislikes a corresponding audio file based on the calculated emotional reaction index; and controlling the reproduction of the corresponding audio file based on whether the user likes or dislikes the corresponding audio file, wherein the pre-stored average of emotional reaction indices for each audio file is a difference between a total emotional reaction index for each audio file less emotional indices measured for a predetermined period of time from a start portion of each audio file.

* * * * *